(12) United States Patent
Tipton et al.

(10) Patent No.: US 7,610,202 B1
(45) Date of Patent: Oct. 27, 2009

(54) INTEGRATED SYSTEM AND METHOD FOR MOBILE AUDIO PLAYBACK AND DICTATION

(75) Inventors: Sandra L. Tipton, Austin, TX (US); Tara L. Marshburn, Austin, TX (US); Sara C. Brumfield, Austin, TX (US); Xiaoping Chen, Austin, TX (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 12/106,405

(22) Filed: Apr. 21, 2008

(51) Int. Cl.
*G10L 13/00* (2006.01)
*G06F 3/00* (2006.01)

(52) U.S. Cl. ............... 704/260; 704/235; 704/275; 715/233; 715/704

(58) Field of Classification Search ............ 704/235, 704/260, 270, 275; 715/230, 233, 704
See application file for complete search history.

(56) References Cited

U.S. PATENT DOCUMENTS

| 5,732,216 | A | * | 3/1998 | Logan et al. ............. 709/203 |
| 5,875,448 | A | * | 2/1999 | Boys et al. ............... 715/201 |
| 7,366,979 | B2 | * | 4/2008 | Spielberg et al. .......... 715/230 |
| 2002/0044129 | A1 | * | 4/2002 | Leiper .................... 345/156 |
| 2002/0099552 | A1 | * | 7/2002 | Rubin et al. ............. 704/270 |
| 2004/0225502 | A1 | * | 11/2004 | Bear et al. ............... 704/270 |
| 2006/0143559 | A1 | * | 6/2006 | Spielberg et al. .......... 715/512 |
| 2008/0276159 | A1 | * | 11/2008 | Narayanaswami et al. .. 715/202 |

* cited by examiner

*Primary Examiner*—Daniel D Abebe
(74) *Attorney, Agent, or Firm*—Wolf, Greenfield & Sacks, P.C.

(57) ABSTRACT

A method and system provides for a single-pass review and feedback of a document. During audio playback of the document to be reviewed, voice-activated recording of feedback and submission of feedback relative to the location in the original document are accomplished. This provides for a fully integrated, single pass review and feedback of documentation to occur.

1 Claim, 2 Drawing Sheets

INTEGRATED SYSTEM AND METHOD FOR MOBILE AUDIO PLAYBACK AND DICTATION

BACKGROUND

Dictation machines are used for a variety of purposes and are especially helpful in situations in which the user must be able to record speech or comments quickly and at any given time. For this reason, mobile dictation machines for use in the car, at home, etc. have become very popular. In addition to the need to simply be able to voice record a comment, there is also the need to be able to review and comment upon documents in mobile situations. The ability to use so-called non-productive time, such as time spent commuting to and from work, to review various documentation, user manuals, and various other documents that must be reviewed and commented upon is an unmet need. Unfortunately, the technology does not currently exist to support this need.

While a user may convert text to audio to listen to a document or may record comments/feedback by use of a voice-enabled digital recorder, such technology has its limitations. If using separate devices to accomplish both tasks, the user must stop one device to start the other, or stop one program and start another if both functions are provided by a single device. If voice recognition technology is used to transcribe recorded comments back to text, the user must manually insert the individual comments in order to provide the feedback in context.

BRIEF SUMMARY

In accordance with embodiments consistent with the present invention, a method and system for mobile audio playback and dictation. In response in response to a user initiating a download of a source document from a computer to a mobile device, a first conversion component of the computer converts the source document to a source audio file and the source audio file is downloaded from the computer to a source audio store of the mobile device. Upon a user initiating a playback mode on the mobile device, an audio playback component of the mobile device enters a playback mode during which the source audio file is played and a voice detection component of the mobile device enters a listen mode during which the voice detection component listens for voice. Upon detection of voice, indicative of a voice interrupt condition, during the playback mode, the voice detection component transmits a pause signal to the playback component to pause the playback mode and the audio playback component transmits a source data buffer index to the voice detection component. After the voice interrupt, the voice detection component records the voice as a comment, stores the comment as a recorded comment and the source data buffer index in a recorded comment store of the mobile device, and transmits a resume signal to the audio playback component to resume the playback mode of the audio playback component. This occurs for each comment spoken by the user during the playback mode.

In response to the user initiating an upload of the source audio file from the mobile device to the computer, the computer retrieves the source audio file from the source audio store and one or more recorded comments and corresponds one or more source data buffer indexes associated with each voice interrupt condition from the recorded comment store. Then, for each recorded comment of the one or more recorded comments retrieved from the recorded comment store, a second conversion component of the computer transcribes the source audio file back into a source document format in an updated source document until the source data buffer index for the recorded comment is encountered. At this point, the second conversion component transcribes the recorded comment into the source document format to generate a source document format comment that is written into the updated source document at the source data buffer index. This occurs for each recorded comment. From a last source data buffer index of a last recorded comment to the end of the retrieved source audio file, the source audio file is transcribed into the source document format in the updated source document.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

In accordance with embodiments consistent with the present invention, a method and system that provides for mobile audio playback and dictation is described herein that provides for a single-pass review and feedback of a document. During audio playback of the document to be reviewed, voice-activated recording of feedback and submission of feedback relative to the location in the original document are accomplished This provides for a fully integrated, single pass review of feedback of documentation to occur.

Figure 1:
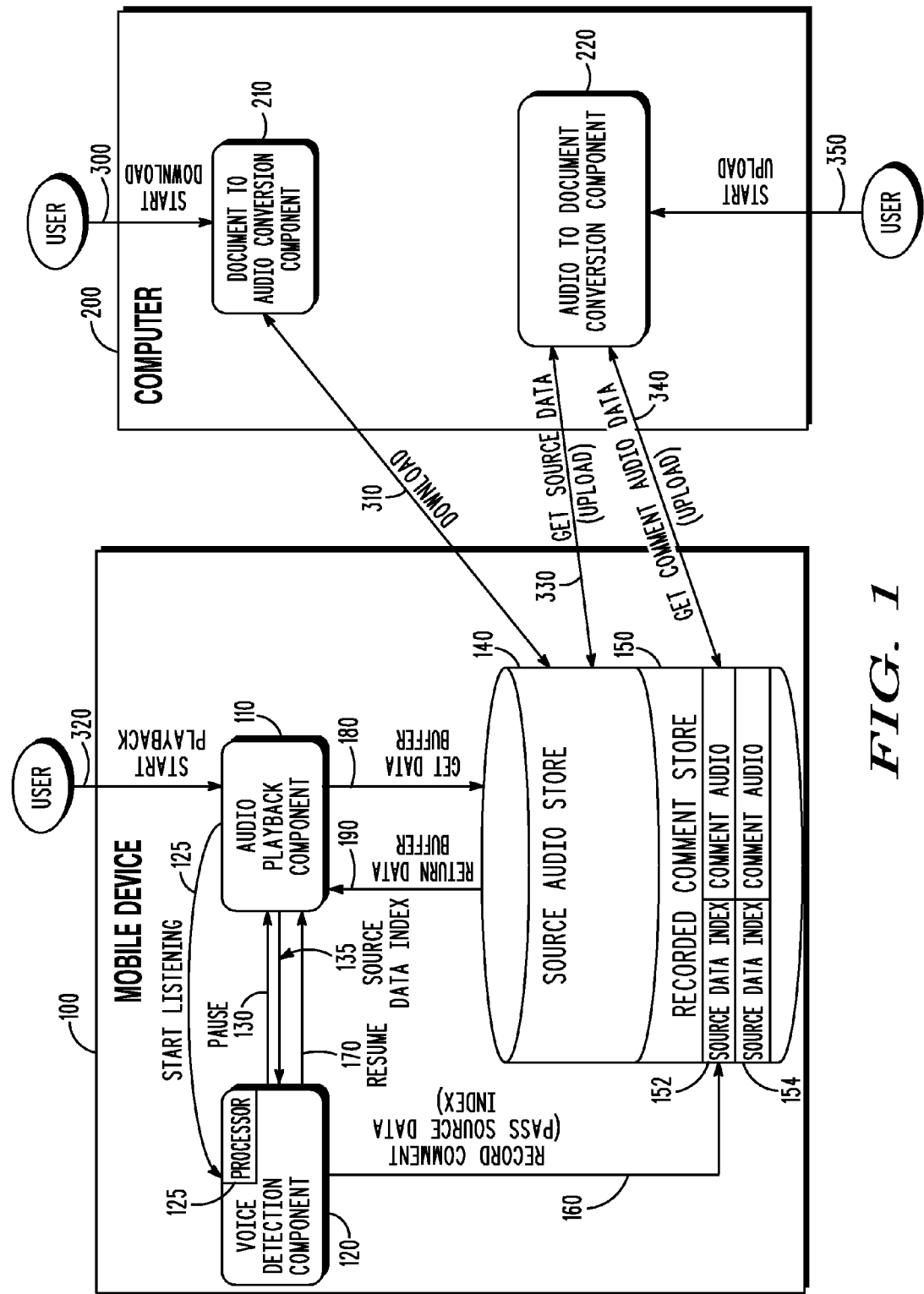
FIG. 1 is a system flow diagram, in accordance with certain embodiments.
Figure 2:
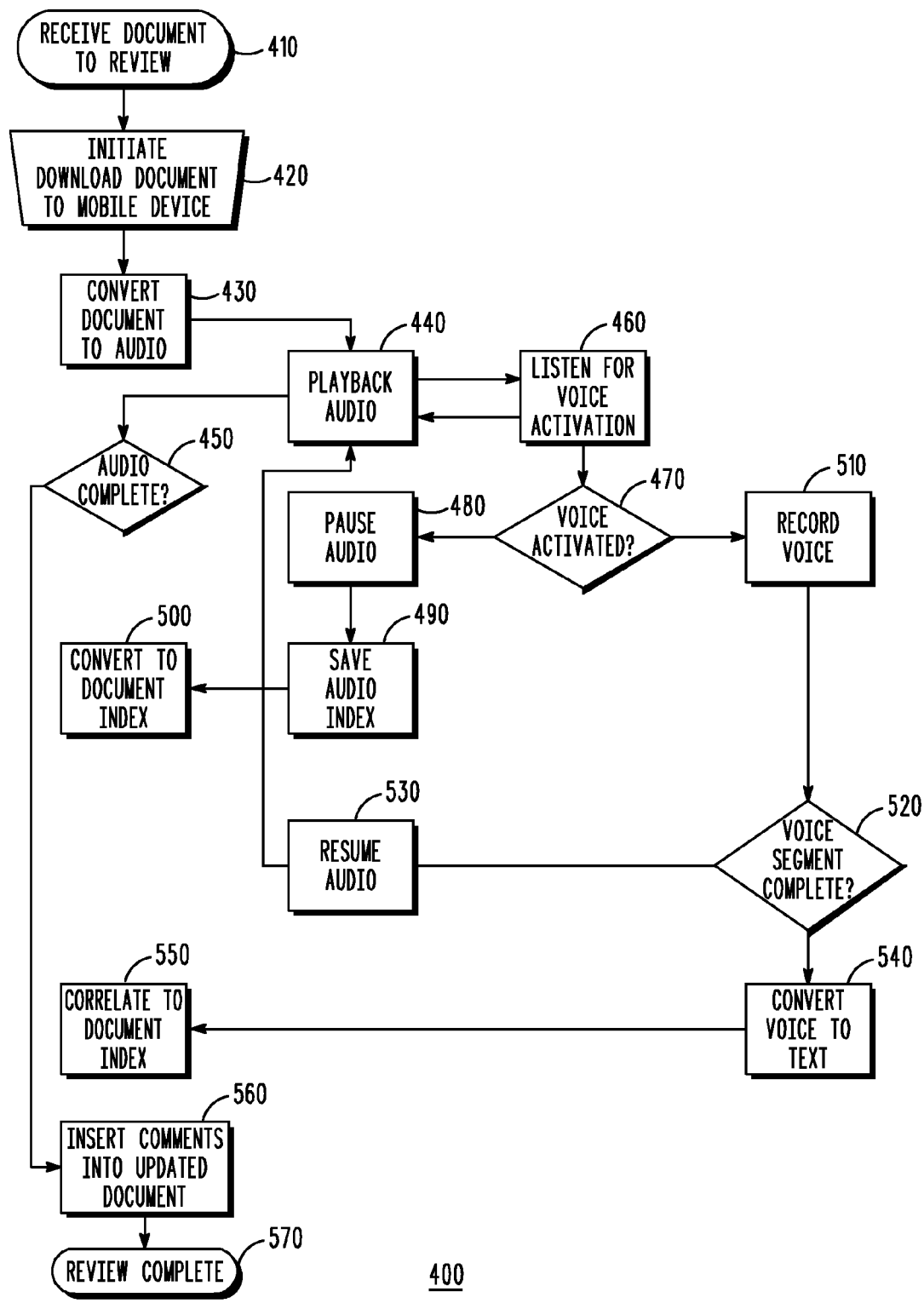
FIG. 2 is a flow chart that illustrates an exemplary flow in accordance with various embodiments disclosed herein.

Reference may be made to FIGS. 1 and 2, in conjunction with the following description. Referring now to the system flow diagram of FIG. 1, when a user wishes to download 300 a source document from his or her computer 200 to a mobile device or machine 100, such as a dictation machine, a PDA, or any other mobile device having audio playback capability, a source document to audio conversion component 210 of the computer 200 converts the source document to a source audio file which is then downloaded 310 to a source audio store 140 of the mobile device 100. The audio file now resides on the mobile device and is available for audio playback to the user when the user so wishes. It is noted that various formats may be used. In addition to traditional audio files, there is the ability to convert various document formats to audio. Examples of document formats include, but are not limited to, Microsoft Word®, Acrobat PDF, PowerPoint®, plain text files, web pages, and emails. Examples of audio formats include MP3, Ogg, VMA® or Wave files.

In response to the user initiating a playback mode 320 on the mobile device 100, an audio playback component 110 of the mobile device enters the playback mode and is in communication with source audio store 140 to get and return data buffer information 180, 190. The source audio file is played and a voice detection component 120 of the mobile device enters a listen mode 125 during which the voice detection component 120 listens for any voice from the user, indicative of an intent by the user to insert a verbal comment into the document at that point at which speak is detected. Processor 125 of voice detection component 120 allows it to listen for voice interrupt while audio plays. Such a voice interrupt is referred to as a voice interrupt condition. Upon the voice detection component detecting voice indicative of a voice interrupt condition during the playback mode, the voice detection component 120 transmits a pause signal 130 to the playback component 110 to pause the playback mode and the audio playback component transmits a source data buffer index 135 to the voice detection component 120.

Upon completion of the voice interrupt condition, the voice detection component records the voice as a comment 160. The comment is stored as a recorded comment and the source data buffer index is also stored 152, 154 in a recorded comment store 150 of the mobile device. A resume signal 170 is transmitted to the audio playback component 110 to resume the playback mode of the audio playback component. This occurs for each voice interrupt condition detected during the playback mode, such that each recorded comment initiated by a voice interrupt has a corresponding source data buffer index associated with it. Upon completion of playing of the audio file, the audio playback component causing the voice detection component to exit the listen mode.

Now the user has been able to insert at the correct points of an audio file comments that may be uploaded at some future time from the mobile device to another device, such as the user's computer. Therefore, in response to the user initiating an upload 350 of the source audio file from the mobile device to the computer, the audio to document conversion component 220 of computer 200 retrieves the source audio file from the source audio store 330 and any recorded comments, together with their corresponding source data buffer indexes associated with each voice interrupt condition, 340 from the recorded comment store. For each recorded comment retrieved from the recorded comment store 150, the audio to document conversion component of the computer transcribes the source audio file back into a source document format in an updated source document until a source data buffer index for a recorded comment is encountered. At that point, the audio to document conversion component transcribes the recorded comment into the source document format to generate a source document format comment that is written into the updated source document at the source data buffer index. If the source document format has a comment capability, the audio to document conversion component 220 may insert the comment using this comment function.

Transcription of the source audio file back into the updated source document then resumes until the next source data buffer index of the next recorded comment is encountered, at which point, the audio to document conversion component transcribes the next recorded comment into the source document format to generate a next source document format comment that is written into the updated source document at the next source data buffer index. This transcription process continues until all recorded comments have been transcribed into the updated source document. Finally, from a last source data buffer index of a last recorded comment to the end of the retrieved source audio file, the remainder of the source audio file is transcribed into the source document format in the updated source document.

Referring now to FIG. 2, flowchart 400 illustrates a method of mobile audio playback and dictation and reinforces the information described above in connection with FIG. 1. At Block 410, a document to review is received. At Block 420, a user may initiate the download of a document to a mobile device, which causes the document to be converted to audio at Block 430 and downloaded. At Block 440, the audio file thus created is played on the mobile device; during playing of the audio file, the mobile device listens for voice activation or voice interrupt at Block 460. Upon voice interrupt occurring, as indicated at Block 470, the audio playback is paused at Block 480 and the corresponding audio index is saved at Block 490 and converted to a document index at Block 500. Also upon voice interrupt occurring, the voice is recorded at Block 510. When the voice segment is complete, Block 520, audio is resumed at Block 530 and the flow playback of the audio file continues at Block 440; also, the voice is converted (transcribed) to text at Block 540 and correlated with the document index at Block 550. At Block 560, transcribed comments are inserted into an updated document, completing the process at Block 570.

It can be understood that the various embodiments presented herein provide for hands-free recognition of vocal comments, thereby enable a person on the go, such as in their car, plane, etc., to easily and readily review and add comments to a document that has been converted to audio format. Voice-activated recording of feedback (comments) occurs automatically in the playback mode with the start and end of a verbal comment being recognized, enabling the process to switch from audio playback to verbal comment and back again with minimal effort on the part of the user; this provides for true hands-free operation, a feature of great value to a user occupied with other tasks, such as driving. Moreover, the updated source document generated upon initiating upload of the source audio file and recorded comments to the computer is a complete document with transcribed comments residing within it.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for mobile audio playback and dictation, comprising:

in response to a user initiating a download of a source document from a computer to a mobile device, a first conversion component of the computer converting the source document to a source audio file, wherein the source document is not a text only document;

downloading the source audio file from the computer to a source audio store of the mobile device;

in response to a user initiating a playback mode on the mobile device, an audio playback component of the mobile device entering a playback mode during which the source audio file is played and a voice detection component of the mobile device entering a listen mode during which the voice detection component listens for voice;

upon the voice detection component detecting voice indicative of a voice interrupt condition or one or more voice interrupt conditions occurring during the playback mode, for each voice interrupt condition detected further comprising:

the voice detection component transmitting a pause signal to the playback component to pause the playback mode and the audio playback component transmitting a source data buffer index to the voice detection component;

upon completion of the voice interrupt condition, the voice detection component recording the voice as a comment, storing the comment as a recorded comment and the source data buffer index in a recorded comment store of the mobile device, and transmitting a resume signal to the audio playback component to resume the playback mode of the audio playback component;

upon completion of playing of the audio file, the audio playback component causing the voice detection component to exit the listen mode; and in response to the user initiating an upload of the source audio file from the mobile device to the computer, further comprising:

the computer retrieving the source audio file from the source audio store and one or more recorded comments and corresponding one or more source data buffer indexes associated with each voice interrupt condition from the recorded comment store;

for each recorded comment of the one or more recorded comments retrieved from the recorded comment store, further comprising:

a second conversion component of the computer transcribing the source audio file back into a source document format in an updated source document until the source data buffer index for the recorded comment is encountered; and the second conversion component transcribing the recorded comment into the source document format to generate a source document format comment that is written into the updated source document at the source data buffer index; and from a last source data buffer index of a last recorded comment of the one or more recorded comments to the end of the retrieved source audio file, transcribing the source audio file into the source document format in the updated source document.

* * * * *